(12) United States Patent
Gravel

(10) Patent No.: US 11,058,068 B1
(45) Date of Patent: Jul. 13, 2021

(54) FLEXIBLE TRELLIS NET

(71) Applicant: Christian Lee Gravel, Thornton, CO (US)

(72) Inventor: Christian Lee Gravel, Thornton, CO (US)

(73) Assignee: Christian Gravel, Thornton, CO (US)

( * ) Notice: Subject to any disclaimer, the term of this patent is extended or adjusted under 35 U.S.C. 154(b) by 219 days.

(21) Appl. No.: 16/261,346

(22) Filed: Jan. 29, 2019

Related U.S. Application Data

(60) Provisional application No. 62/658,448, filed on Apr. 16, 2018, provisional application No. 62/658,015, filed on Apr. 16, 2018.

(51) Int. Cl.
*A01G 9/12* (2006.01)
*A01G 13/02* (2006.01)

(52) U.S. Cl.
CPC ........... *A01G 9/12* (2013.01); *A01G 13/0206* (2013.01)

(58) Field of Classification Search
CPC ...... A01G 13/10; A01G 9/12; A01G 13/0243; A01G 17/06; A01G 13/0237; A01G 13/105; A01G 17/00; A01G 17/04; B65D 19/38; B65D 2519/00293; B65D 2519/00373; B60R 7/005; B60P 7/0876; D07B 1/185; D07B 2501/2061; D07B 2501/2038

See application file for complete search history.

(56) References Cited

U.S. PATENT DOCUMENTS

| | | | | |
|---|---|---|---|---|
| 905,983 A * | 12/1908 | Brown | ................... | A01G 17/06 47/46 |
| 1,055,914 A * | 3/1913 | Hus | ......................... | A01G 9/12 47/45 |
| 1,480,917 A * | 1/1924 | Robinson | ............... | A01G 17/06 47/44 |
| 2007/0266693 A1* | 11/2007 | Kato | ........................ | A01G 9/12 57/210 |
| 2014/0196365 A1* | 7/2014 | Washington | ............. | A01G 9/02 47/66.6 |
| 2017/0325416 A1* | 11/2017 | MacDonald | ........... | A01G 17/06 |

* cited by examiner

*Primary Examiner* — Timothy D Collins
*Assistant Examiner* — Brittany A Lowery

(57) ABSTRACT

A flexible trellis net can be used for growing plants in a grow tent having a series of tent poles. The flexible trellis net includes a trellis that has a mesh lower netting, joined to the series of tent poles, and further has lower netting latitudinal ropes knotted to lower netting longitudinal ropes creating a mesh lower netting plurality of rectangles that are configured for supporting and training the plants within the grow tent. A mesh upper netting is joined to the series of tent poles, and further has upper netting latitudinal ropes knotted to upper netting longitudinal ropes creating a mesh upper netting plurality of rectangles that are configured for supporting fruiting plants and flowers within the grow tent.

2 Claims, 4 Drawing Sheets

FLEXIBLE TRELLIS NET

RELATED APPLICATION

This application claims priority to provisional patent application U.S. Ser. No. 62/658,448 filed on Apr. 16, 2018 and to provisional patent application U.S. Ser. No. 62/658,015 filed on Apr. 16, 2018, the entire contents of both applications is herein incorporated by reference.

BACKGROUND

The embodiments herein relate generally to a flexible trellis net for growing plants on hard surfaces such as patios or decks. Garden trellis is an affordable way to create a beautiful garden and protect plants. However, one of the problems with many trellises is that they are of fixed size, secured together firmly and when not require a great deal of time to dissemble. Additionally, grow trellises are generally made up of nylon or other hard material which are harsh for plants. Embodiment of a flexible trellis net described here is made from soft material like rope. It is flexible and stretchable can be used on hard or soft surfaces such as patios, decks or in garden soil. Standard method is to cut a trellis net to fit into grow tent and attach it to the tent poles with a zip tie and for harvesting the plants the netting needs to be cut out and replaced. The embodiment described here uses metal hooks to attach to poles within a grow tent for support and cannot only help in facilitating plant growth but is also easier for crop harvesting. The embodiment of flexible trellis net is unique as it can fit different sizes of grow tents thus, eliminating the need to cut the net to size. It is lightweight, flexible adjustable, versatile, easy to assemble and disassemble for subsequent use.

SUMMARY

A flexible trellis net can be used for growing plants in a grow tent having a series of tent poles. The flexible trellis net includes a trellis that has a mesh lower netting, joined to the series of tent poles, and further has lower netting latitudinal ropes knotted to lower netting longitudinal ropes creating a mesh lower netting plurality of rectangles that are configured for supporting and training the plants within the grow tent. A mesh upper netting is joined to the series of tent poles, and further has upper netting latitudinal ropes knotted to upper netting longitudinal ropes creating a mesh upper netting plurality of rectangles that are configured for supporting fruiting plants and flowers within the grow tent.

A plurality of mesh lower netting hooks can be attached to the mesh lower netting and to the series of tent poles. A plurality of mesh upper netting hooks can be attached to the mesh upper netting and to the series of tent poles. Each mesh lower netting rectangle can have a mesh lower netting minor axis of approximately four inches. Each mesh upper netting rectangle can have a mesh upper netting minor axis of approximately six inches.

The mesh lower netting can be made from a rope that has at least eight latex strands braided together and surrounded by a sheath. The sheath can be made from a blend of cotton and carbon fiber.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
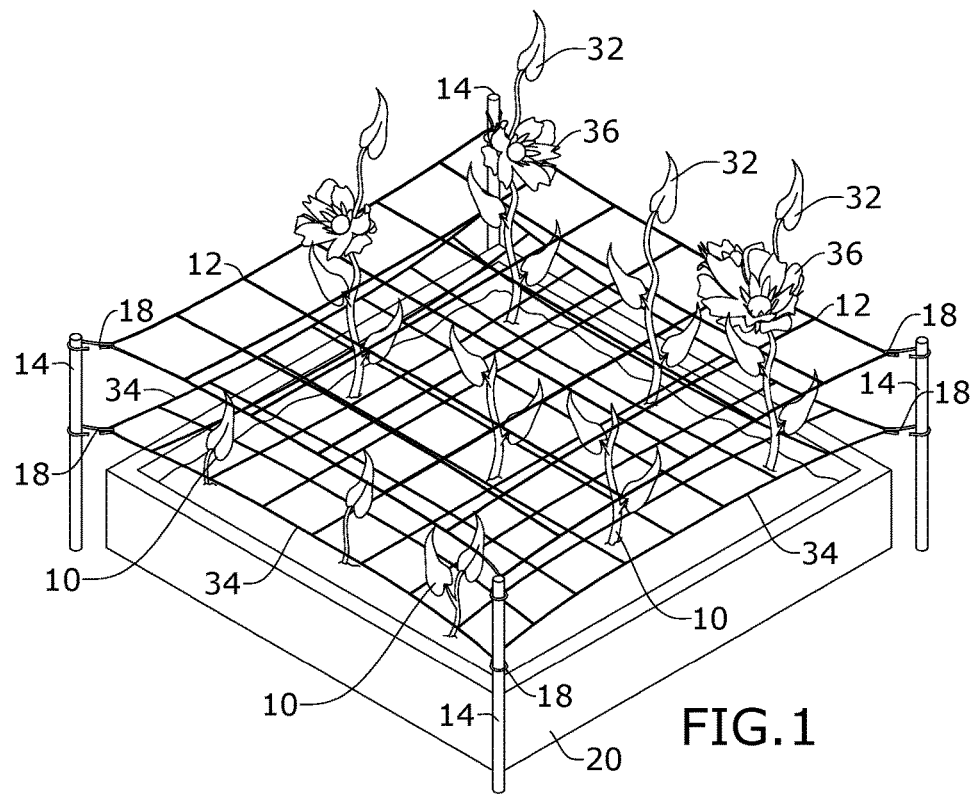
FIG. 1: is a perspective view of the invention in use.
Figure 4:
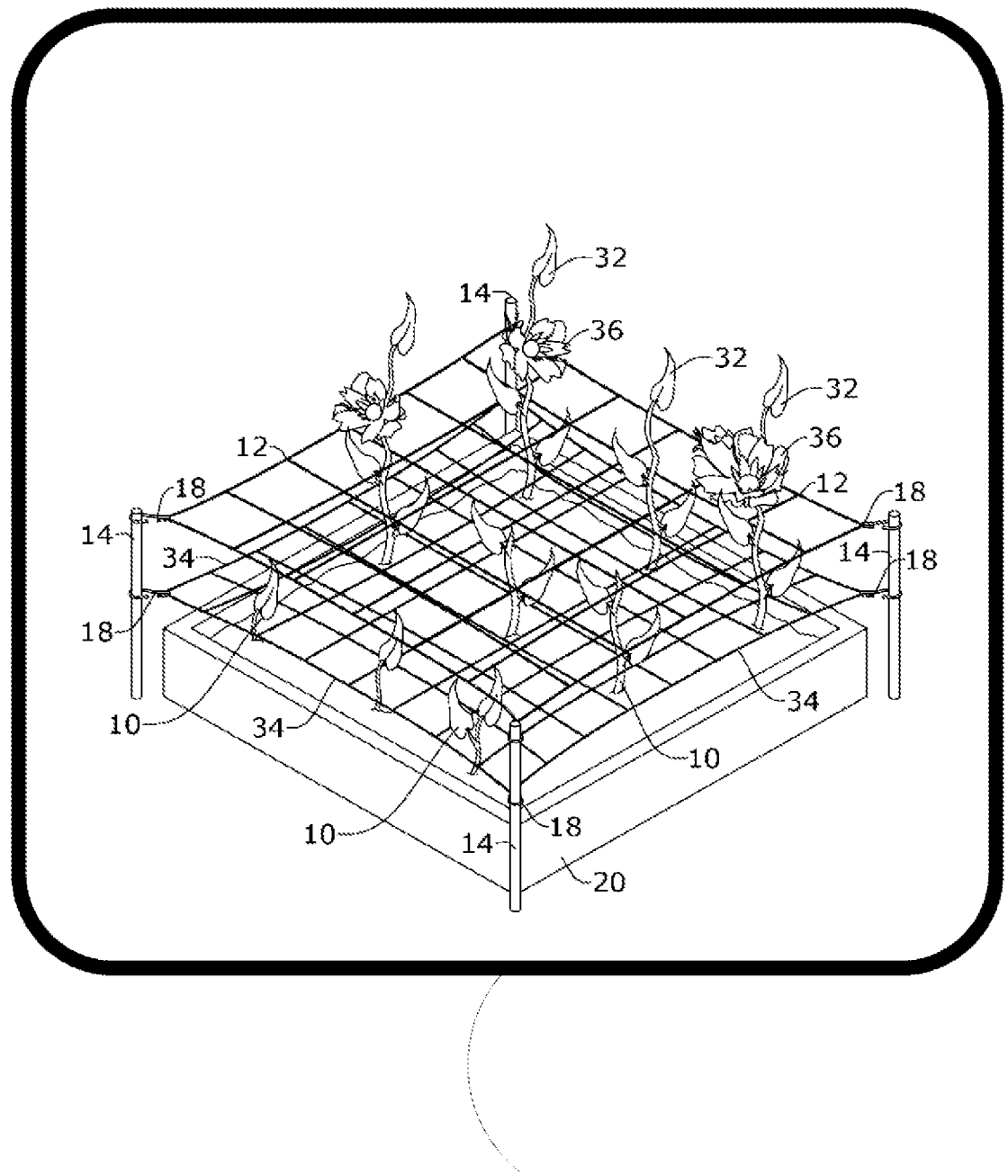
FIG. 4 is a front view of a flexible trellis in a grow tent.

By way of example, and referring to FIG. 1, one embodiment of the present system comprises a trellis for supporting and training climbing plants 10, comprising a 6" mesh upper netting 12 that supports fruiting plants and flowers and a 4" mesh lower netting 34 to support and train the plants within the grow tent 40 shown in FIG. 4 wherein the mesh netting is formed using a flexible rope, the longitudinal and cross threads of which are knotted together at the intersections to form rectangular lower 4" mesh 34 and upper 6" mesh 12. The embodiment disclosed here also include metal hooks 16 and 18 attached to the four corners of the 6" mesh upper netting 12 and to the four corners of the 4" mesh lower netting 34. A system for a flexible trellis net for growing plants configured for easy assembly and disassembly also consist of four poles 14 having an upper 22 and lower receiving-net 24 on each pole. Wherein, the 6" upper mesh 12 attaches to the upper receiving-loop 22 on each pole by inserting metal hooks 18 on the corners of the 6" mesh into the rectilinear net-receiving upper loops-on each pole; whereas, the 4" lower mesh 34 attaches to the rectilinear lower holes on each pole by inserting metal hooks on the corners of the 4" mesh 34 into the net-receiving lower loops-on the poles. Thus, enabling the net to form a trellis of variable width by coupling the net to the four corners of the poles 14 within a grow tent to form a flexible net lattice shaped to span the space 3 between said poles and support the trellis.

Figure 2:
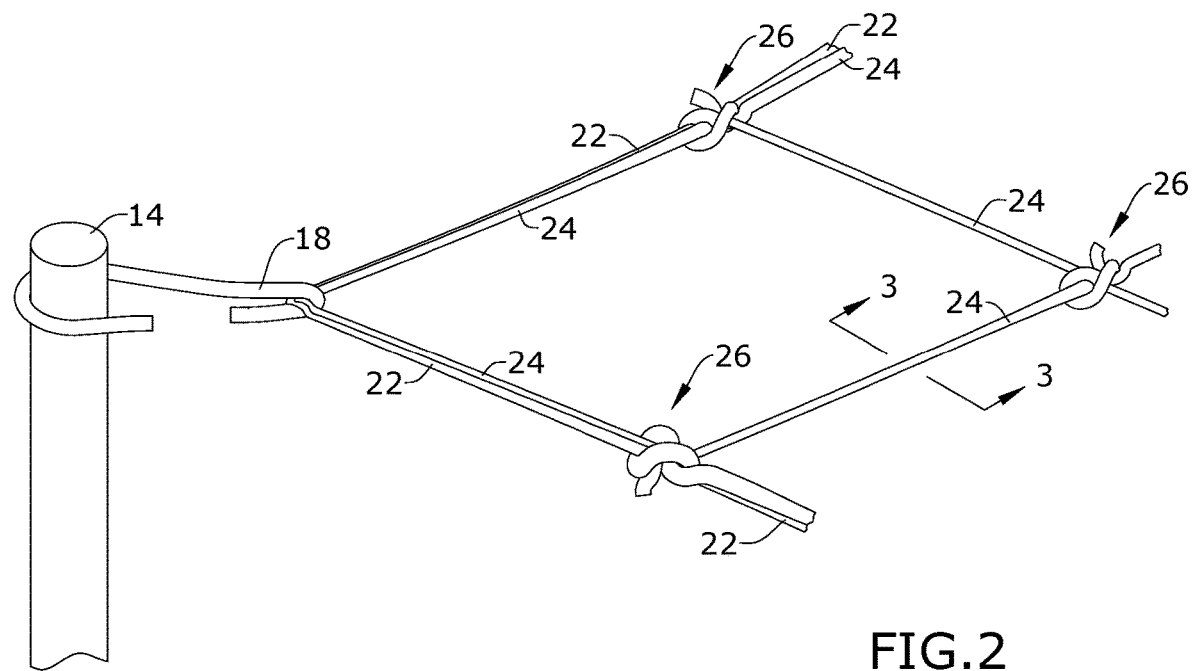
FIG. 2: is a detailed perspective view of the invention.

One embodiment of the present system-as shown in FIG. 2 comprising a 6" mesh upper netting 12 that supports fruiting plants and flowers. Wherein, the mesh netting is formed using a flexible rope, the longitudinal and cross threads of which are knotted together at the intersections to form rectangular net. The embodiment as shown in FIG. 2 also includes metal hooks 16 attached to the four corners of the 6" mesh upper netting 12. A system for a flexible trellis net for growing plants configured for easy assembly and disassembly also consist of four poles 14 having an upper 12 and lower receiving-net—34 on each pole. Wherein, the 6" upper mesh 12 attaches to the upper receiving-loop 22 on each pole by inserting metal hooks—18 on the corners of the 6" mesh into the rectilinear net-receiving upper loops 22 on each pole. Thus, enabling the net to form a trellis of variable width by coupling the net to the four corners of the poles 14 within a grow tent to form a flexible net lattice shaped to span the space between said poles and support the trellis.

Figure 5:
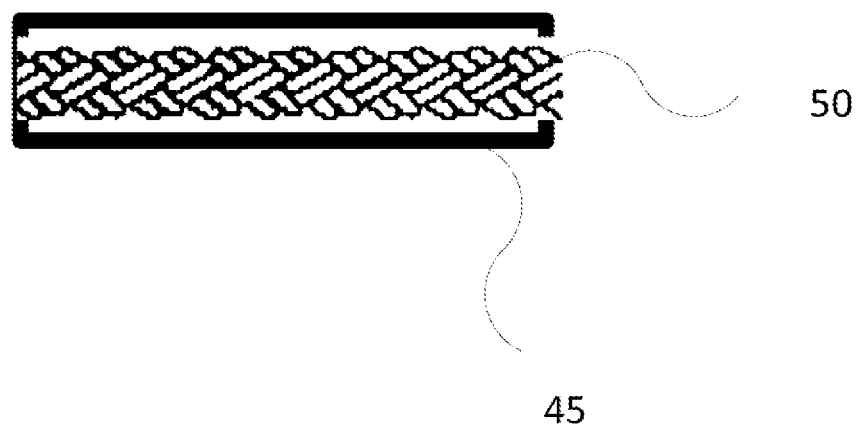
FIG. 5 is a is a side view of a sheath and eight latex strands braided together.

In some embodiments; the mesh netting can be made from a rope comprising eight or nine latex strands 30 braided together and surrounded by a sheath 28. This sheath 28 can be made from a blend of cotton and carbon fiber. This construction is resilient to plastic deformation under tension proximate the corner posts of the trellis net except for the corner rectangles. FIG. 5 shows an alternative embodiment of a sheath 45 and eight latex strands braided together 50.

Figure 3:
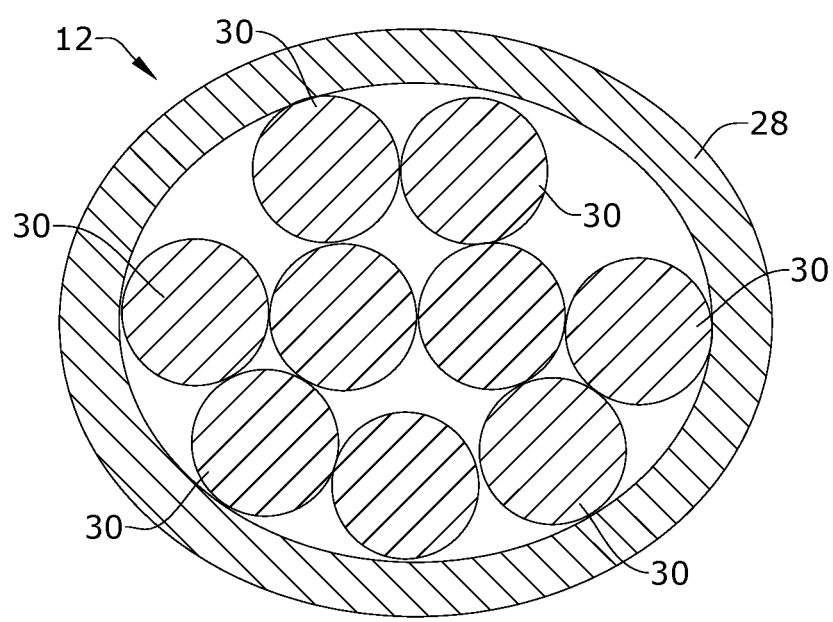
FIG. 3: is a section view of the invention, taken along line 3-3 in FIG. 2.

The embodiment of the flexible trellis system shown in FIG. 2-3 further comprises of an outer additional rope—22 and an inner portion of the rope 24 with knots 26 attached to the inner and outer ropes to provide strength. Wherein, the outer additional rope 22 and an inner rope 24 are configured to forms knots 26 at each corner of the trellis.

The embodiment of the flexible trellis system can also be used as a vertical climbing trellis outside in the garden. FIG. 1 shows a plant container 20, a plant above the upper mesh 32, and a plant below upper mesh 10, and a fruiting plant or flower 36.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A flexible trellis net for growing plants in a grow tent having a series of tent poles; the flexible trellis net comprising: a trellis further comprising: a mesh lower netting, joined to the series of tent poles, and further comprising lower netting latitudinal ropes knotted to lower netting longitudinal ropes creating a mesh lower netting plurality of rectangles that are configured for supporting and training the plants within the grow tent; and a mesh upper netting, joined to the series of tent poles, and further comprising upper netting latitudinal ropes knotted to upper netting longitudinal ropes creating a mesh upper netting plurality of rectangles that are configured for supporting fruiting plants and flowers within the grow tent; wherein the trellis is paired with a plant container placed within a quadrant defined by the series of tent poles; wherein the mesh lower netting latitudinal and longitudinal ropes do not interlock except in a knot at four corner rectangles, and wherein the mesh upper netting latitudinal and longitudinal ropes do not interlock except in a knot at four corner rectangles; wherein the trellis supports plants below the upper mesh and supports plants above the upper mesh; wherein the flexible trellis net is assembled and disassembled by looping the mesh lower netting and the mesh upper netting to a plurality of netting hooks at the tent poles, the mesh lower netting and mesh upper netting having rope with an inner portion and an outer portion, the rope inner portion comprising at least eight latex strands braided together and surrounded by the rope outer portion comprising a sheath; wherein the sheath comprises carbon fiber and is resilient to plastic deformation under tension proximate the tent poles while inside the grow tent.

2. The flexible trellis net of claim 1, wherein each mesh lower netting rectangle has a mesh lower netting minor axis of approximately four inches, and wherein each mesh upper netting rectangle has a mesh upper netting minor axis of approximately six inches.

\* \* \* \* \*